United States Patent
Kowoll

(10) Patent No.: US 7,682,579 B2
(45) Date of Patent: Mar. 23, 2010

(54) METHOD AND DEVICE FOR NOZZLE-JETTING OF OXYGEN WITH RADIAL CATALYST FLOW

(75) Inventor: Johannes Kowoll, Bochum (DE)

(73) Assignee: Uhde GmbH, Dortmund (DE)

( * ) Notice: Subject to any disclaimer, the term of this patent is extended or adjusted under 35 U.S.C. 154(b) by 554 days.

(21) Appl. No.: 10/587,007

(22) PCT Filed: Jan. 15, 2005

(86) PCT No.: PCT/EP2005/000369

§ 371 (c)(1),
(2), (4) Date: Aug. 22, 2006

(87) PCT Pub. No.: WO2005/070530

PCT Pub. Date: Aug. 4, 2005

(65) Prior Publication Data

US 2008/0241023 A1 Oct. 2, 2008

(30) Foreign Application Priority Data

Jan. 21, 2004 (DE) .................. 10 2004 003 070

(51) Int. Cl.
  *B01J 8/02* (2006.01)
  *B01J 35/02* (2006.01)
  *C07C 5/327* (2006.01)
(52) U.S. Cl. .................. 422/218; 422/220; 422/211; 585/658
(58) Field of Classification Search .................. 422/211, 422/218, 220; 585/658
See application file for complete search history.

(56) References Cited

U.S. PATENT DOCUMENTS

| 262,692 A | 8/1882 | Rigg |
| 2,361,623 A | 10/1944 | Guyer et al. |
| 2,518,583 A | 8/1950 | Watson |
| 2,584,391 A | 2/1952 | Leffer |
| 2,632,692 A | 3/1953 | Korin et al. |
| 2,809,981 A | 10/1957 | Kittlelson et al. |
| 2,954,281 A | 9/1960 | Schutt |

(Continued)

FOREIGN PATENT DOCUMENTS

CA  2050248  3/1992

(Continued)

OTHER PUBLICATIONS

Machine translation of EP364664 A1, which was provided in the IDS with a publication date of Apr. 25, 1990.*

(Continued)

*Primary Examiner*—Walter D Griffin
*Assistant Examiner*—Natasha Young
(74) *Attorney, Agent, or Firm*—Collard & Roe, P.C.

(57) ABSTRACT

The invention relates to a method and device for the injection of oxygen in a reformer reactor, for example, for oxydehydrogenation, with an essentially radial throughflow of the gas mixture through a catalytic packing, whereby the incorporation and mixing of the oxygen before entry into the catalyst is significantly improved, in particular for oxydehydrogenation methods. The above is achieved, whereby the oxygen is introduced in pure form, as air, or mixed with inert gas, or with steam, into an annular distribution system (5) and injected out of a number of outlet openings (6) in the annular distribution system, at an angle to the perpendicular, onto the catalyst surface (3).

7 Claims, 2 Drawing Sheets

U.S. PATENT DOCUMENTS

Figure 1:
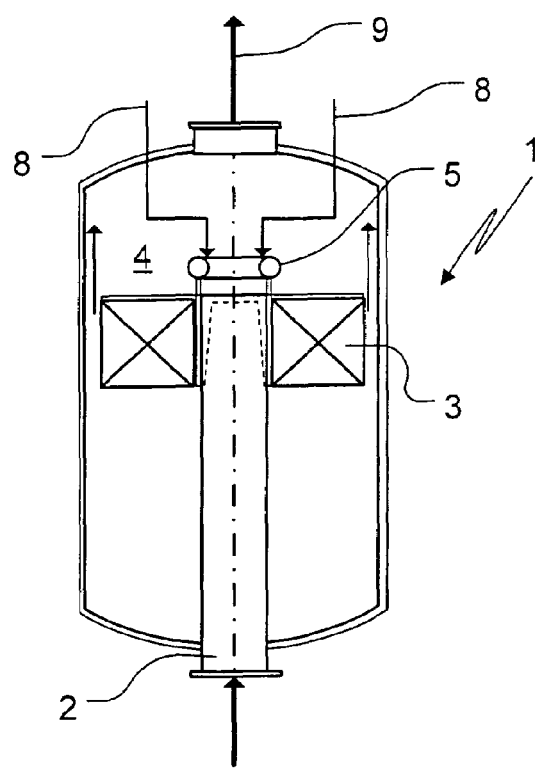

| | | |
|---|---|---|
| 3,208,833 A | 9/1965 | Carson |
| 3,515,763 A * | 6/1970 | Uitti .......................... 585/441 |
| 3,685,971 A | 8/1972 | Carson |
| 3,855,330 A * | 12/1974 | Mendelsohn et al. ........ 585/441 |
| 4,223,843 A * | 9/1980 | Smith et al. ................. 239/558 |
| 4,705,621 A | 11/1987 | Penick et al. |
| 4,741,885 A | 5/1988 | Herbort et al. |
| 4,963,338 A * | 10/1990 | Zardi et al. ................. 423/360 |
| 4,971,771 A | 11/1990 | Stahl et al. |
| 4,994,239 A * | 2/1991 | Skraba ....................... 422/144 |
| 5,043,500 A * | 8/1991 | Tagamolila ................. 585/319 |
| 5,430,219 A | 7/1995 | Sanfilippo et al. |
| 5,439,859 A * | 8/1995 | Durante et al. ............... 502/66 |
| 5,935,489 A | 8/1999 | Hershkowitz et al. |
| 2002/0098136 A1 | 7/2002 | Vanderborgh |

FOREIGN PATENT DOCUMENTS

| | | |
|---|---|---|
| DE | 32 40 089 A | 10/1983 |
| DE | 43 33 372 A | 4/1994 |
| EP | 0 364 664 B | 4/1990 |
| EP | 360981 A2 * | 4/1990 |
| EP | 0 473 870 | 3/1992 |
| GB | 2 065 492 A | 7/1981 |
| GB | 2 110 105 | 6/1983 |
| WO | WO 01/76731 | 10/2001 |

OTHER PUBLICATIONS

Machine translation of EP360981 A2, which was published on Apr. 4, 1990.*

International Search Report in English, (completed Apr. 4, 2005).

* cited by examiner

METHOD AND DEVICE FOR NOZZLE-JETTING OF OXYGEN WITH RADIAL CATALYST FLOW

CROSS REFERENCE TO RELATED APPLICATIONS

Applicant claims priority under 35 U.S.C. §119 of German Application No. 10 2004 003 070.7 filed Jan. 21, 2004. Applicant also claims priority under 35 U.S.C. §365 of PCT/EP2005/000369 filed Jan. 15, 2005. The international application under PCT article 21(2) was not published in English.

The invention pertains a method and device for nozzle-jetting of oxygen in a synthesis reactor, for example, for oxi-dehydration, with mainly radial flow of the gas mixture through a catalyst packing.

There is a series of catalytic methods, in which oxygen is additionally added to the gas to be treated in a reactor, say in the so-called oxi-dehydration of propane or butane, whereby the oxygen in the oxi-dehydration reactors is mixed to the gas flowing in before entry into the catalyser. It has been seen that, especially the irregular mixing through the gas flowing into the catalyser with oxygen, leads to unsatisfactory results, whether in the form of soot formation above the catalyser or insufficient material yield, say the yield of propylene.

This is where the invention comes in, with the task of improving the entry and mixing of oxygen before entering into the catalyser, particularly for oxi-dehydration method.

With the help of the method already described above, this task as per the invention is fulfilled, in that the oxygen is added to a ring distributor system in pure form, as air or mixed with inert gas or in water vapour, and is nozzle-jetted on to the catalyser surface at an angle to the vertical through multiple exit openings in the ring distributor.

It has been seen that, through this method a thorough mixing can be attained in a very short time of <100 msec. so that the reaction time in zones with over-stoichiometric oxygen concentration and the non-catalytic reaction get minimized. As the mixing takes place in open air and the oxygen-rich mixing has no contact with walls or with the catalyser, the damage of materials/substances due to the jetted-in oxygen get minimized.

Extensions of the invention can be obtained from the sub-claims.

Depending on the design of the reactor, it could be purposeful to carry out the nozzle jetting of oxygen from a cylindrical plane in the interior of the catalyser bed in the direction on to the reactor wall. The method as per the invention could thereby foresee the nozzle jetting with the help of several parallel pipes with exit openings forming a cylindrical inner axial plane.

A special extension of the invention consists of the fact that the nozzle jetting of the oxygen in a cylindrical axial plane take place approx. 50 to 300 mm before the cylindrical inner wall of the catalyser bed, which ensure an oxygen dwelling time of $\leq 1$ sec. in the chamber before the catalyser bed. The dwelling time could be 100 msec, preferably $\leq 15$ msec.

As a solution for this task, the invention foresees a device, which has the special feature of a ring distributor with several pipes with exit openings forming an inner cylindrical plane before the cylindrical inner surface of the catalyser bed, whereby the exit openings are designed for releasing the oxygen at an angle to the perpendicular, on to the catalyser cylindrical surface.

In an advantageous extension it could be foreseen, that the gas exit openings are aligned in alternating sequence to adjacent exit openings of an adjacent ring pipe, whereby adjacent gas exit openings could have different flow exit directions.

A further advantageous extension of the invention consists of the fact, that the gas exit openings are designed as holes or nozzles.

A few literature documents are referred to at this point, to illustrate the state-of-the-art technology. Thus the document DE-43 33 372-A, which publishes a production method of olefins from gas mixture containing methane; the document DE-32 40 089-A or U.S. Pat. No. 5,935,489, which indicates a method and a device for synthesis gas production with partial oxidation, or the U.S. Pat. Nos. 2,518,583, 2,809,981 or 2,954,281. From the document U.S. Pat. No. 2,584,391, one can take the nozzle jetting of a reactant in directions deviating from the perpendicular, in order to achieve more effective contact between solid and gas particles in a fluidised bed of a reactor. For further state-of-the-art technology, one can also mention the documents U.S. Pat. No. 2,632,692, U.S. Pat. No. 3,208,833, GB-2 065 492-A or EP-0 364 664-B.

Figure 2:
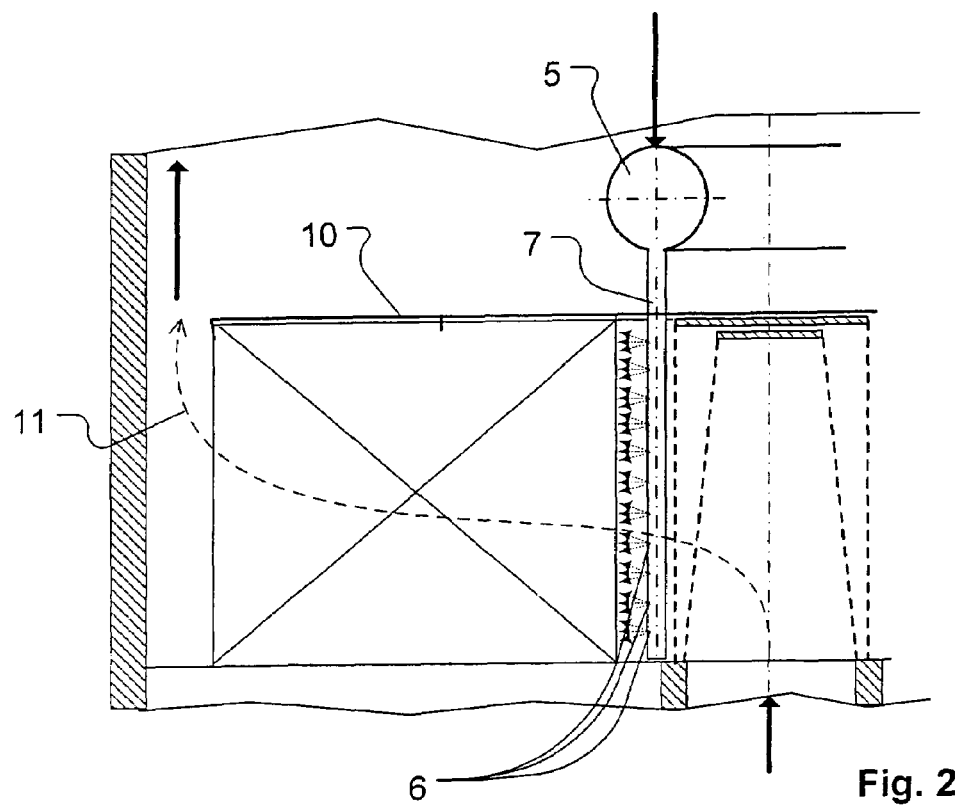
Figure 3:
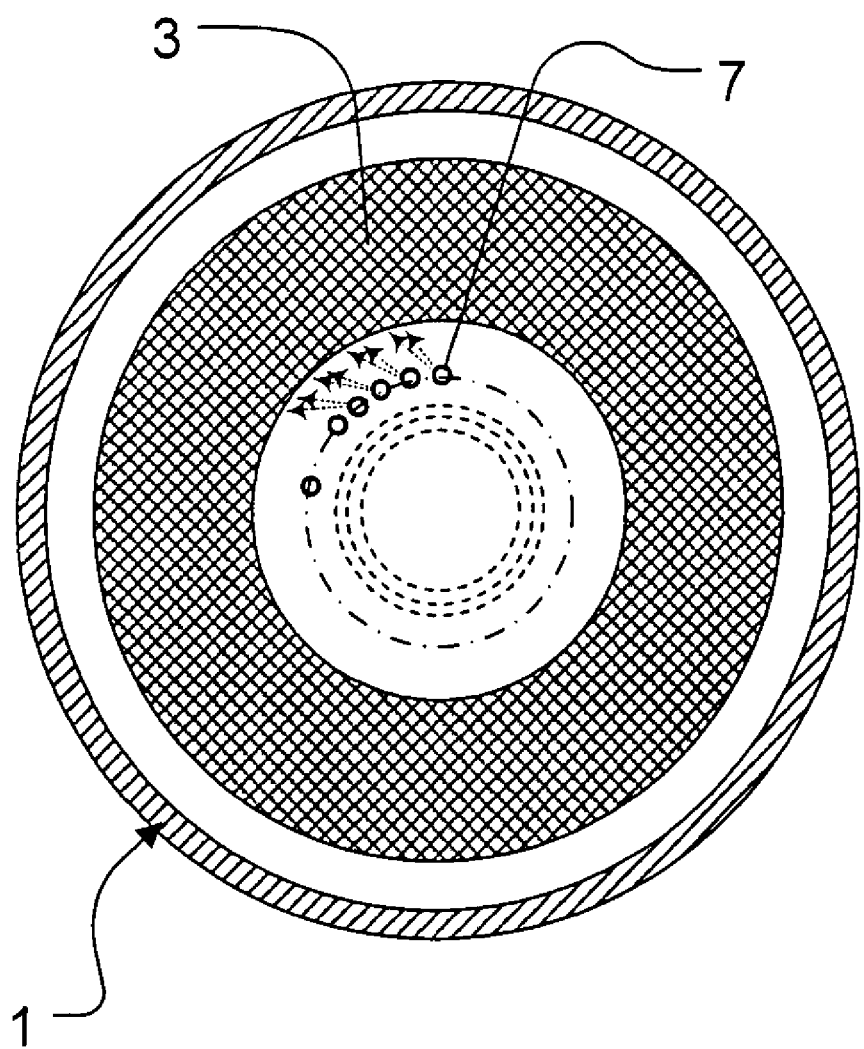

Further features, details and advantages of the invention can be obtained on the basis of the following descriptions and the drawings. The following are shown:

FIG. 1 A highly simplified depiction of the device as per the invention;

FIG. 2 A detailed enlargement in the region of the catalyser with indicated gas flow; and FIG. 3 A cross-section of the reactor in the region of the catalyser.

The oxi-reactor schematically shown in section in FIG. 1 and generally denoted by 1 has a gas inlet pipe 2, which centrically goes through a catalyser 3 up to an upper covering 10, whereby in the upper region of the reactor 1 a gas dome 4 is designed. In the gas dome 4 there is a ring distributor 5 for oxygen in pure form, as air or mixed with inert gas or water vapour, whereby this ring pipe 5 is equipped with several pipes 7 pointing perpendicularly downwards and provided with exit openings 6. The exit openings 6 are arranged in such a way, that the respective gas jet gets directed on to the cylindrical inner catalyser surface at an angle to the perpendicular, which is depicted in FIGS. 2 and 3 by small arrows.

In FIG. 1, the $O_2$— or gas entry into the ring distributor 5 is indicated by the arrow 8, the gas exit from the reactor is indicated by the arrow 9.

The flow path of the gas flowing through the reactor with the additional oxygen is indicated in FIG. 2 by a dashed arrow 11.

Obviously the described design example of the invention can be changed in several aspects without deviating from the basic idea; especially the angle of impact can be selected also differently than the one shown, depending on the model of the reactor. In particular cases of application, it could be useful to conceive the flow of the catalyser packing from outside to inside. This is however not always required in oxi-reactions due to increase in volume, but could nevertheless be of advantage in some cases (high volume velocities) due to by-product formation or similar occurrences.

The invention claimed is:

1. Method for nozzle jetting of oxygen into a synthesis reactor for oxi-dehydration, with mainly radial flow of a gas mixture through a catalyzer packing, wherein oxygen is added to a ring distributor system in pure form, as air or mixed with inert gas or water vapor, and is then jetted from the ring distributor system directly to the catalyzer surface at an angle to the vertical through several exit openings in the ring distributor system, wherein the oxygen and the gas mixture first begin mixing immediately preceding entry to the catalyzer packing, after the oxygen is jetted from the ring distributor system, and wherein the nozzle jetting of the oxygen is carried out from the cylindrical plane in the interior of the catalyzer bed in the direction towards the reactor wall.

2. Method as claimed in claim 1, wherein the nozzle jetting is carried out with the help of several parallel pipes having exit openings and forming a cylindrical inner axial plane.

3. Method as claimed in claim 1, wherein the nozzle jetting of the oxygen takes place in a cylindrical axial plane approx. 50 to 300 mm before the cylindrical inner wall of the catalyzer bed, which ensures an oxygen dwelling time of $\leqq 1$ sec. in a chamber before the catalyzer bed.

4. Device for nozzle-jetting of oxygen into a synthesis reactor for oxi-dehydration with mainly radial flow of the gas mixture to a catalyzer packing, particularly for conducting a method as claimed in claim 1, wherein there is a ring distributor with several pipes with exit openings, wherein the several pipes together form an inner cylindrical plane before the cylindrical inner surface of the catalyzer bed, whereby the exit openings are aligned to release the oxygen on to the cylindrical catalyzer surface at an angle to the vertical.

5. Device as claimed in claim 4, wherein the gas exit openings are aligned in alternating sequence to adjacent exit openings of an adjacent ring pipe.

6. Device as claimed in claim 4, wherein adjacent exit gas openings reveal different flow exit directions.

7. Device as claimed in claim 4, wherein the gas exit openings are designed as holes or nozzles.

* * * * *